A. Ralston.
Portable Animal-Tether.
N° 74475. Patented Feb. 11, 1868.

Sheet 2.
3 Sheets.

Witnesses.

Inventor.

A. Ralston.
Portable Animal-Tether.
N° 74475. Patented Feb. 11, 1868.

Sheet 3.
3 Sheets.

Witnesses. Inventor.

United States Patent Office.

ANDREW RALSTON, OF WEST MIDDLETOWN, PENNSYLVANIA.

Letters Patent No. 74,475, dated February 11, 1868.

IMPROVEMENT IN PORTABLE ANIMAL-TETHER.

*The Schedule referred to in these Letters Patent and making part of the same.*

TO ALL WHOM IT MAY CONCERN:

Be it known that I, ANDREW RALSTON, of West Middletown, in the county of Washington, and State of Pennsylvania, have invented a Portable Stock-Feeding Hitching-Frame; and I do hereby declare that the following is a full, clear, and exact description thereof, reference being had to the accompanying drawings, making part of this specification, in which—

Similar letters of reference indicate corresponding parts in the several figures.

The object of this invention is to afford a simple and very convenient means whereby stock can be allowed perfect freedom for grazing, and at the same time prevented from straying beyond certain limits.

The nature of my invention consists in a frame, which is constructed of two upright posts or standards, mounted upon portable foundations or carriages, and arranged at any desired distance apart, said posts being connected together by means of a strong hitching-cable or chain, which is arranged a sufficient height from the ground to allow the animals which are hitched to it to pass beneath it, and which is provided with means for taking up the slack, and keeping it under proper tension, as will be hereinafter described.

The invention further consists in attaching to a hitching-rope or chain, which is sustained at a suitable height above ground, by means of stationary or movable posts, one or more swivelling pulley-carrying pendants, provided with a rope which has a weight attached to one end, and a chain and snap-hook attached to the other end, as will be hereinafter described, whereby animals can be readily hitched to the rope or chain above them, and allowed to graze within certain limits, without liability of becoming entangled by the lines.

To enable others skilled in the art to understand my invention, I will describe its construction and operation.

Figure 1:
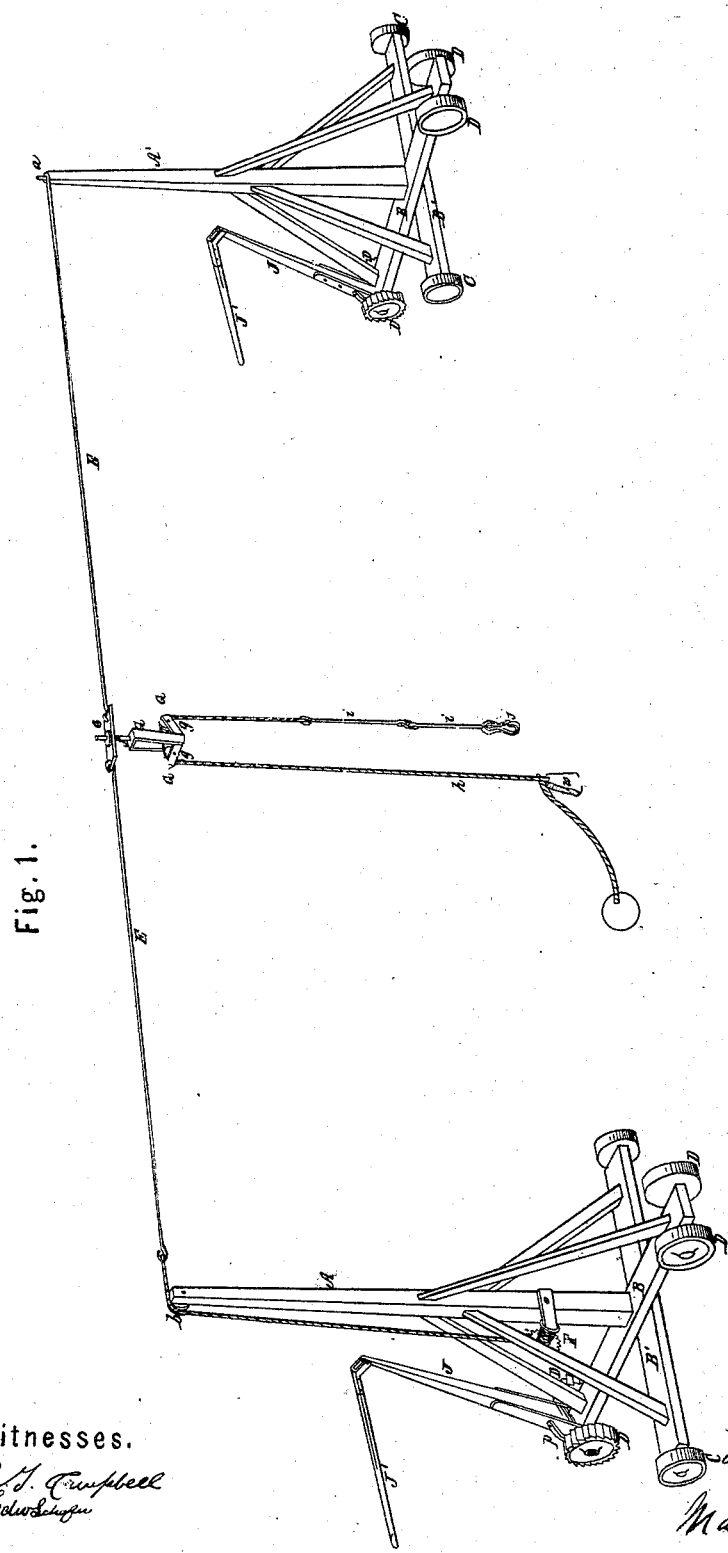
Figure 1 is a perspective view of the portable stock-hitching frame.
Figure 2:
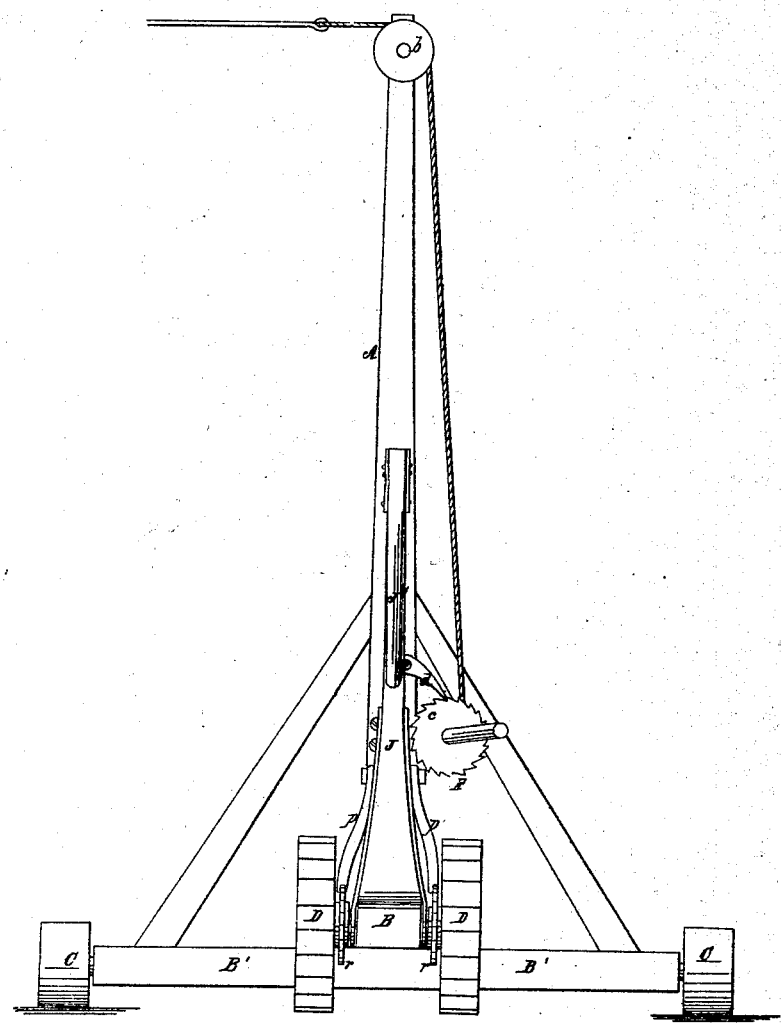
Figure 2 is an elevation of one of the portable hitching-posts.
Figure 4:
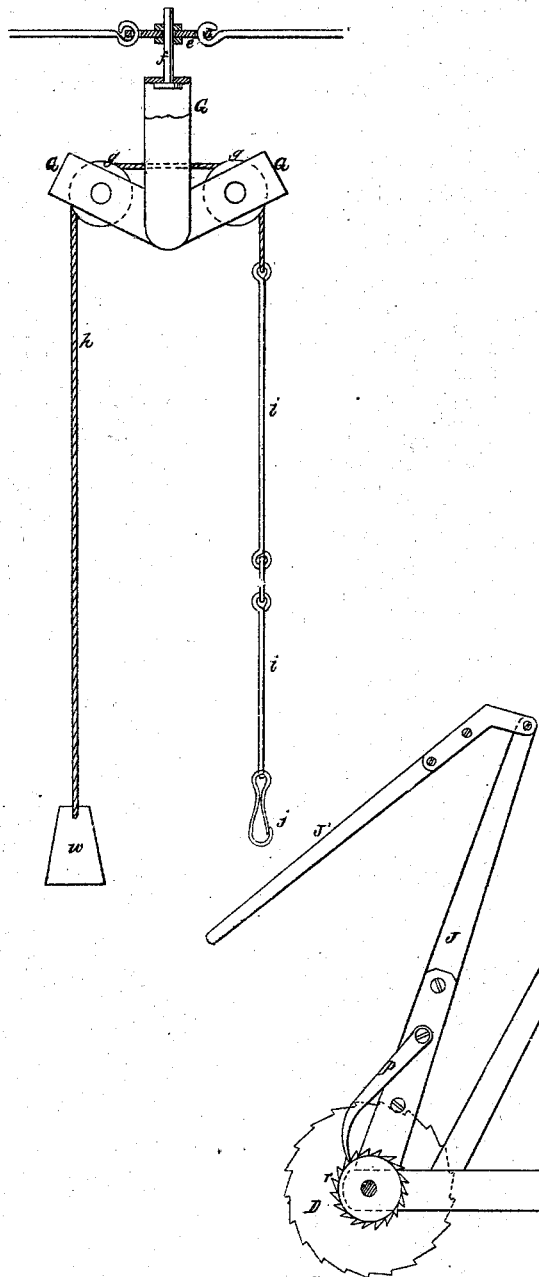
Figure 4 shows the loaded tether and its swivelling pendant.
Figure 3:
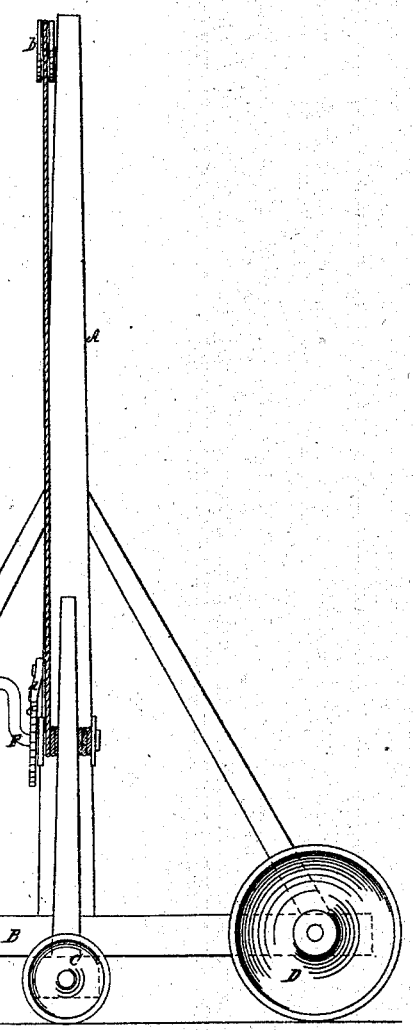
Figure 3 is an end-elevation of the same.

In the accompanying drawings, A A' represent two strong posts or standards, which are applied to independent carriages, so that they can be moved about from one place to another with facility. Both carriages are constructed alike, and the two posts which they sustain are about an equal length. Each one of the carriages consists of two strong beams, B B', crossed, as shown in the drawings, and mounted upon rollers or wheels, C D. The posts A A' of the carriages are firmly braced and sustained in upright positions, so that they will resist all the strain to which they may be subjected when in use. The crossed timbers forming the foundations for the posts, should be made of sufficient length to afford wide base-supports for their posts, and prevent liability of their being overturned. The posts A A' are connected together by means of a rope or chain, E, which is attached at one end to a pin, $a$, at the upper end of post A', and passed over a grooved pulley, $b$, at the upper end of the post A, as clearly shown in fig. 1. From pulley $b$, the rope or chain E is carried down and attached to the drum of a windlass, F, which is applied to post A, near its base, and provided with a ratchet, $c$, and pawl, $d$, for keeping the rope or chain under proper tension. Instead of using a rope or chain, metal rods may be employed, as shown in fig. 1, extending from one post to the other, and provided with eyes on their extremities, as shown. When such rods are employed, they can be drawn tight and kept under proper tension, by employing a rope or chain for connecting one end to the windlass F. At an intermediate point between the two posts A A', I attach to the rods, rope, or chain E, a plate, $e$, to which a pin, $f$, having a head on its lower end, is firmly secured. This pin $f$ is held in a vertical position, and sustains an inverted T-shaped frame, G, in such manner as to allow this frame to swivel or turn horizontally around the pin $f$. Upon the extended arms of frame G, and between the plates thereof, are pulleys $g\ g$, over which a rope, $h$, passes, that carries on one end a weight, W, and has attached to the other end two or more linked rods, $i\ i$. The lowermost rod $i$ has a snap-hook, $j$, or other suitable fastening-device attached to it, by means of which an animal can be readily fastened and unfastened.

By means of the above-described contrivance, an animal can be fastened to the hitching-rope or chain E, and allowed to graze around a distance equal to the length of the tether. The tether being composed of long links or rods, $i$, and a rope or chain, $h$, and suspended from the extended arms of a swivelling-frame, as described, it will be seen that these features, in connection with the weight upon one end of the tether, will prevent it from becoming tangled, or getting in the way of the animal hitched to it. In practice, the hitching-chain or rope, E, may be made long enough, and the posts A A' set far enough apart to allow of the tethering to it of a number of animals. As the posts and their carriages are necessarily very heavy, I employ long levers, J J, for facilitating the moving of these posts and carriages from one place to another. These levers have rods, J' J', pivoted to their upper ends, by means of which they can be vibrated. Each frame or carriage is provided with one of the levers J, which is pivoted to the axle of the large traction-wheels D D, which axle is keyed to and caused to turn with said wheels. Two pawls, $p\ p$, are applied to each lever J, which engage with the ratchet-wheels $r\ r$, upon said axle, when the lever J is vibrated in one direction, and thus allow the post-carriage to be moved by means of this lever. In fig. 1, I have shown, attached to the weight W, an auxiliary weight and cord or chain, which will serve to counteract the weight of the chain $i$, and keep it under proper tension at all times.

Having described my invention, what I claim as new, and desire to secure by Letters Patent, is—

1. A portable stock-feeding hitching-frame, consisting of upright posts A A', mounted upon carriages, and provided with a hitching-rope or chain, E, and also with means for keeping this rope or chain under proper tension, substantially as described.

2. In combination with uprights A A', and a hitching-rope or chain, E, I claim a swivel-frame, G, and a loaded tether, $h\ i$, substantially as described.

ANDREW RALSTON.

Witnesses:
   E. B. WILSON,
   EDW. SCHAFER.